2 Sheets–Sheet 1

FRANKLIN WHITAKER.

Improvement in Self Acting Gates.

No. 119,438.                                Patented Sep. 26, 1871.

Witnesses
E. H. Bates
F. B. Curtis

Inventor.
F. Whitaker,
Admr of S. Whitaker,
Chipman Hosmer & Co,
Attys.

FRANKLIN WHITAKER.
2 Sheets-Sheet 2.

Improvement in Self Acting Gates.

No. 119,438.          Patented Sep. 26, 1871.

Witnesses
E. H. Bates
P. D. Kane

Inventor:
F. Whitaker,
Admr. of Samuel Whitaker,
Chipman Hosmer & Co.
Atty.

119,438

UNITED STATES PATENT OFFICE.

FRANKLIN WHITAKER, OF BEL AIR, MARYLAND, ADMINISTRATOR OF THE ESTATE OF SAMUEL WHITAKER, DECEASED.

IMPROVEMENT IN SELF-ACTING GATES.

Specification forming part of Letters Patent No. 119,438, dated September 26, 1871.

*To all whom it may concern:*

Be it known that I, FRANKLIN WHITAKER, of Bel Air, in the county of Harford and State of Maryland, am administrator, &c., of SAMUEL WHITAKER, deceased, who invented a new and valuable Improvement in Automatic Gates; and I do hereby declare that the following is a full, clear, and exact description of the construction and operation of the same, reference being had to the annexed drawing making a part of this specification, and to the letters and figures of reference marked thereon.

Figure 1:
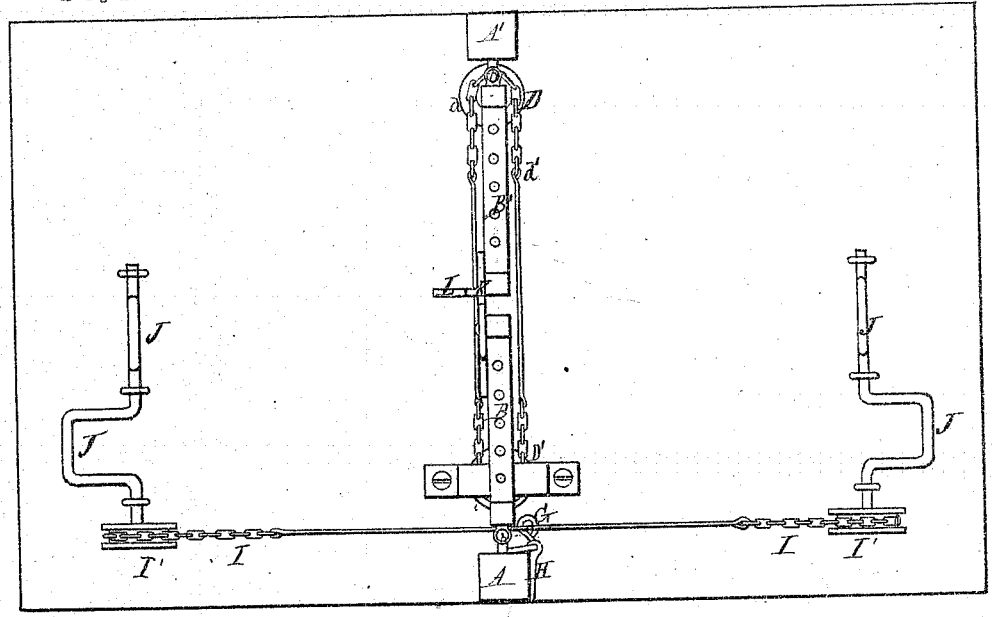
Figure 2:
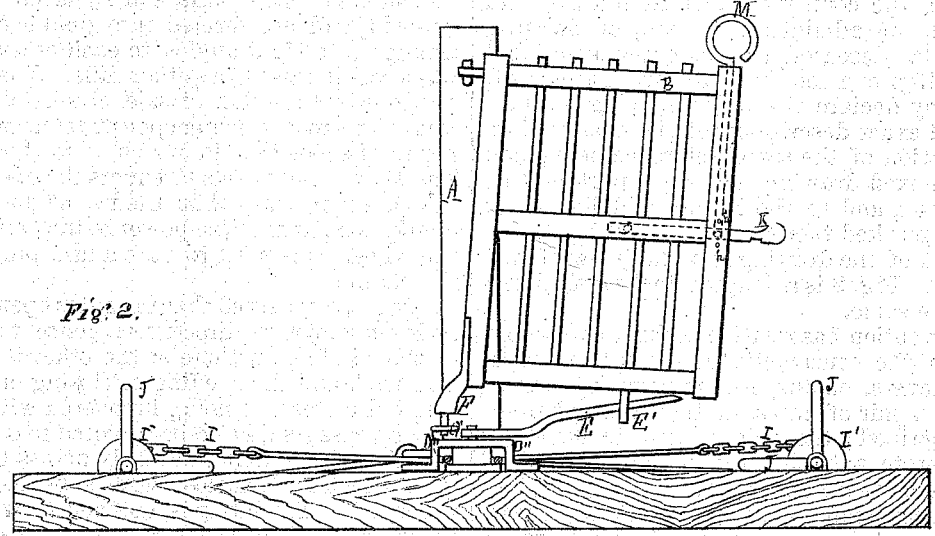

Figure 1 of the drawing is a plan view of this invention. Fig. 2 is a longitudinal vertical section of the same.

This invention has relation to farm gates; and consists in the construction and novel arrangement of levers, chains, and pulleys, in connection with a pair of gates, in the manner hereinafter described; the object being to have the gates operate automatically at the approach of a carriage or other wheel vehicle.

In the accompanying drawing, A A' represent, respectively, two opposite gate-posts, between which are hung two gates, B B'. Each of these gates is hinged at the top in the ordinary manner by means of loop and hook $b$. To the lower end of the gate B, at its rear edge, is attached a vertical pivot, $b'$, the point of which turns in a bearing formed in the gate-sill C or in a block inserted in the ground. D designates a pulley-wheel fixed on said pivot, and formed with a flange, $d$. An endless chain, $d'$, passes around the wheel D, and also around a wheel of the same kind marked D', which is arranged underneath the gate B, and is covered by a cap, D'', which constitutes the bearing to the upper end of its shaft, the lower end of the same turning in the gate-sill in the same way as the pivot $b'$. E designates a lever secured to the shaft of pulley D', and thence extending through a loop, E', projecting from the bottom of gate B. The object of this arrangement of the lever and loop is to cause the pulley-wheel to turn when the gate B' swings, and hence, through the medium of the chain $d'$, to operate the gate B. F represents a hinge-hook, which, being secured to the lower part of gate B, falls into an eye in the upper arm of a double-armed lever, G, or bell-crank, supported by a bracket, H, which is attached to the post A. I represents chains secured to the lower arm of lever G by connecting-rods, and passed around distant pulleys I'. The shafts of said pulleys are journaled to the gate-sill, and are formed into double-cranks J, arranged at right angles to each other, so that when one is raised the other falls. The passing over one or the other of said cranks of a wheel causes the gate to swing open or to close, according to the position in which it is at the time. The use of the wheels I' renders the operating of the gate more easy than the use of an ordinary crank, as it confines the power to the periphery of the wheel, causing it to take a firm purchase on the chain.

It will be observed that the gates open respectively in opposite directions; hence the action of the wind against one or the other is counterbalanced, and the opening or closing of the gate assisted instead of being interfered with.

K represents a latch-bar pivoted to one side of gate B and extending partially across the other gate, which is furnished with a beveled catch, marked L. The latter is notched to receive the bar K, which is also notched and embraces the catch. The latch-bar is confined between two small pegs or pins, $k$, and is operated by a vertical rod, M. This latch acts as a bar to one side of the gate, and as an ordinary latch to the other side. The gates are released automatically from said latch by reason of gate B' being thrown out of plumb when the double-armed lever-hinge is actuated by the means already specified.

Having thus fully described the invention of SAMUEL WHITAKER, deceased, what I claim as new, and desire to secure by Letters Patent, is—

1. The double-armed lever G, chains I, pulleys I', and cranks J, in combination with the gate B, staple E', and pivoted sliding arm E, substantially as described.

2. The pulleys D D', chain $d'$, and lever E, in combination with the gates B B', as and for the purpose described.

In testimony that I claim the above I have hereunto subscribed my name in the presence of two witnesses.

FRANKLIN WHITAKER,
*Administrator.*

Witnesses:
D. D. KANE,
F. B. CURTIS.

(130)